R. MICHAELS.
STORE FRONT CONSTRUCTION.
APPLICATION FILED OCT. 2, 1919.
1,382,111.
Patented June 21, 1921.
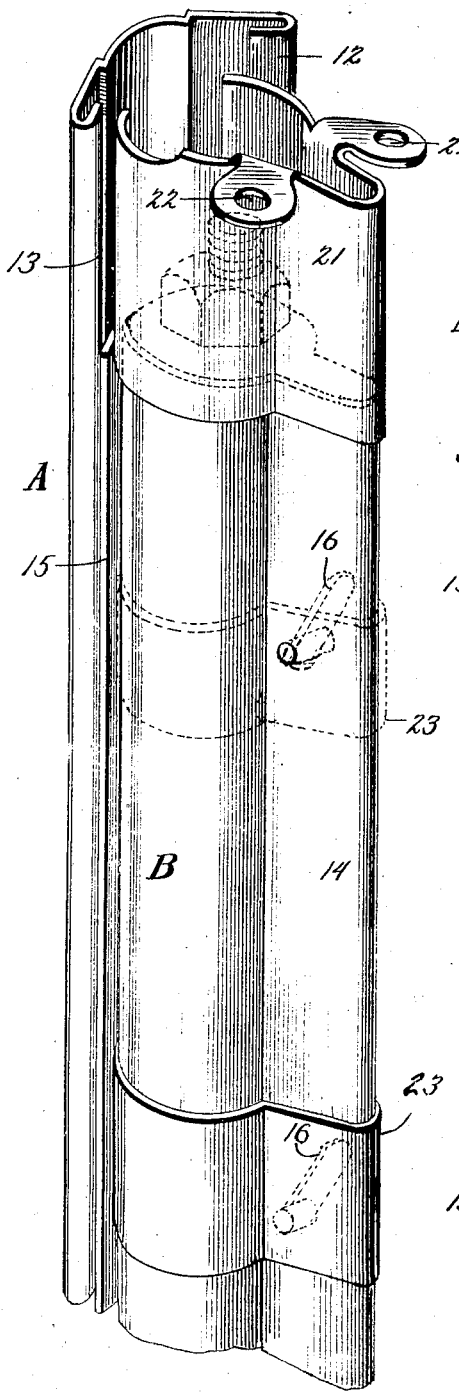
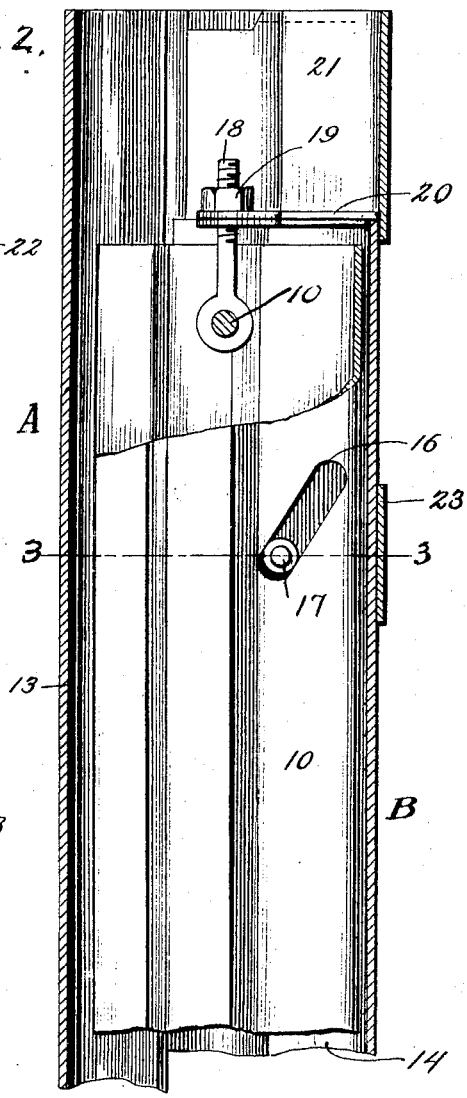
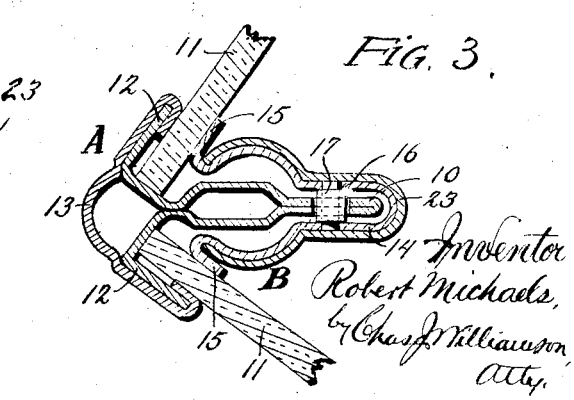

UNITED STATES PATENT OFFICE.

ROBERT MICHAELS, OF CHICAGO, ILLINOIS, ASSIGNOR TO BIASCO MANUFACTURING COMPANY, OF CHICAGO, ILLINOIS, A CORPORATION OF ILLINOIS.

STORE-FRONT CONSTRUCTION.

1,382,111.     Specification of Letters Patent.     Patented June 21, 1921.

Application filed October 2, 1919. Serial No. 327,866.

*To all whom it may concern:*

Be it known that I, ROBERT MICHAELS, of Chicago, Illinois, have invented certain new and useful Improvements in Store-Front Constructions; and do hereby declare that the following is a full, clear, and exact description thereof.

My invention relates to the sash, or glass-supporting members for the large, and costly, plates of what is known as store front construction, and in the narrowest aspect, my object is to provide a corner bar of such construction that it will find favor with manufacturer, installer, or assembler, and owner, or customer, that is, all concerned, or interested in the subject, and for the attainment of that object my invention consists in the sash or glazing member having characteristics as hereinafter specified and defined by, or embraced within the claims.

In the drawings:—

Figure 1 is a perspective view of enough of a corner bar, to illustrate an embodiment of my invention;

Fig. 2 is a vertical section thereof;

Fig. 3 is a horizontal section on line 3—3 of Fig. 2.

The corner bar, in store front construction receives and supports the vertical edges of two plates of glass that stand at an angle relative to one another, and it comprises two vertical, sheet metal members, and means for clamping such members upon the interposed portions of the plates.

In the embodiment of my invention shown in the drawings, the member that engages the glass plates on the outside, is designated generally A, and roughly speaking, is T-shaped in cross section, the shank or stem 10 passing between the two plates 11 of glass, so as to extend on the inside and outside of the window, with the cross or head of the T on the outside so as to provide oppositely projecting lips or flanges 12 that overlap the edges of the respective glass plates 11, and said member, to secure strength and stiffness is preferably made of sheet steel, with a molding shell 13 of copper or other suitable metal that covers the head on the outside to make a handsome finish, with its edges folded over the edges of the flanges 12 to provide a softer metal for contact with the glass, as well as to join these two members.

Loosely fitting over the stem 10, and also made of sheet copper, or other suitable metal, is a member designated generally B, that has a shank or stem 14, which terminates in two oppositely, and outwardly extending lips 15 that, respectively, engage the plates of glass on their inner sides.

At suitable intervals, vertically, the member A has in its stem 10, similar downwardly and outwardly inclined slots 16, and the stem 14 of the member B has for each slot, a cross pin or roller 17 that passes through the slot, so that any downward movement of the member B will cause its lips 15 to press upon the inner sides of the glass plates and clamp the same against the lips 12 on the outside thereof. Means are provided to cause such downward movement and with a force to cause an adequate but safe clamping action on the plates of glass. I prefer such clamping means to consist of a simple screw and nut device,—the screw 18 being attached to the stem 10, preferably at the top thereof, and standing vertically, and the nut 19 bearing against a plate or washer 20 that fits upon the top of the member B, and thereby when turned, acting to move the member B downward and outward. It will be seen that the pressure exerted on the glass is simultaneously and uniformly exerted throughout the length of the clamping members, and thus no unequal strain or pressure that endangers the glass falls upon it in spots, or at separated points, as is the case when the clamping means is a series of independently manipulated bolts or nuts, and such pressure is gently and easily applied, and the glass setting operation is quickly done because the bar members are in assembled relation when sent to the job, and but a single nut must be manipulated. The clamps are self-adjusting to the thickness of the glass, so no time is lost in adjustment.

By locating the adjusted nut at the top of the bar, access to it is so inconvenient that the danger of some incompetent or unauthorized person disturbing the proper pressure adjustment on the glass, after installation is removed, and as an additional safeguard in that behalf, and as well as to make an attractive finish, I inclose the nut and bolt by a section 21 of copper or other appropriate sheet metal that conforms to the cross section of the member B, and fits slidably on the outside thereof, so that it may be moved down to expose the nut, and up to conceal it, and which at its top has one or more horizontal ears 22 perforated for the passage of screws to secure said section 21 in its raised position. The sheet metal shell 13, at the top reaches above the nut to the level of the top edge of the section 21 when the latter is in its raised and secured position.

To secure a handsome appearance, and add strength to the member B, and also to cause its lips 15 to exert a gentle, resilient pressure on the glass plates, the sides of the stem, adjacent said lips, are bowed outward, preferably in a simple concavo-convex curve, and preferably the portion of the stem 10 of member A that is within the space thus provided, is also similarly shaped, but with flat, or angular sides.

If it be desired to conceal the ends of the pins, or pivots of the rollers 17 when they protrude through the member B, a short strap-like section 23 of sheet metal having the same cross section as the member B may be applied over the same.

Inasmuch as gravity acts to cause a constant downward tendency on the member B, it is impossible for the clamp to work loose and deprive the glass plates of proper support, and gravity, of course, aids in setting so that but little effort is required to clamp the glass.

Besides the very important functional and other advantages which have been noted, my invention is further advantageous in that there are no projecting nuts or bolts to disfigure the appearance of the bar, the inside member is as shapely and attractive as the outside member, there are no numerous small nuts, or the like, troublesome to handle and easily dropped, and the parts can be readily manufactured and all assembled at the shop.

I, of course, do not restrict myself only to corner bars, but intend to comprehend within the scope of the claims, except where they clearly read otherwise, any other bars or sash members.

I claim:—

1. An article of the class described, comprising two vertical, opposing members, one of which is movable longitudinally and toward the other, and coacting elements on the respective members that guide such movable member in such movement.

2. An article of the class described, comprising two vertical, opposing members, one of which is movable longitudinally and toward the other, and means connecting them that permits such movement, comprising a plurality of inclined slots in one member and slot-engaging devices on the other member.

3. An article of the class described, comprising two vertical, opposing members, one of which is movable longitudinally and toward the other, coacting elements on the respective members that guide such movable member in such movement, each member having a pair of oppositely extending glass-engaging lips.

4. The combination of two, bar-form members, opposing glass-engaging lips associated with both, means connecting them that permit oblique movement of one relative to the other, comprising coacting elements in the respective members, and a single adjusting device that produces such movement.

5. The combination of two vertical, bar-form members, opposing glass-engaging lips associated with both, means connecting them that permit oblique movement of one relative to the other, comprising coacting guiding elements in the respective members, and a single adjusting device that produces such movement.

6. A sash bar comprising two T-shaped vertical members, a sliding connection between the stems of the T's, permitting movement of one longitudinally and toward the other, and a screw device to cause such movement situated at the top thereof, and a slidable cover for such device.

7. A device of the class described, comprising a glass-engaging sheet metal member, T-shaped in cross section to provide glass-engaging lips and a stem, the stem being bowed outward adjacent the lips and means for exerting pressure through such bowed-out portions on the lips toward the glass.

In testimony that I claim the foregoing I have hereunto set my hand.

ROBERT MICHAELS.